United States Patent
Karschnia et al.

(10) Patent No.: US 7,440,735 B2
(45) Date of Patent: Oct. 21, 2008

(54) VIRTUAL WIRELESS TRANSMITTER

(75) Inventors: Robert J. Karschnia, Chaska, MN (US); Marcos Peluso, Chanhassen, MN (US)

(73) Assignee: Rosemount Inc., Eden Prairie, MN (US)

( * ) Notice: Subject to any disclaimer, the term of this patent is extended or adjusted under 35 U.S.C. 154(b) by 108 days.

(21) Appl. No.: 10/278,321

(22) Filed: Oct. 23, 2002

(65) Prior Publication Data

US 2004/0203434 A1     Oct. 14, 2004

(51) Int. Cl.
*H03C 1/62* (2006.01)
(52) U.S. Cl. ................................ 455/115.4; 340/3.1
(58) Field of Classification Search .......... 455/517, 455/556.1, 404.1, 405, 412.1, 412.2, 414.1, 455/95, 115.4, 226.4; 702/188, 183, 56, 702/57; 342/114; 73/379.01; 340/7.2, 7.21, 340/3.1
See application file for complete search history.

(56) References Cited

U.S. PATENT DOCUMENTS

| | | | |
|---|---|---|---|
| 5,385,297 A | 1/1995 | Rein et al. | 236/49.3 |
| 5,630,164 A | 5/1997 | Williams et al. | 395/800 |
| 5,946,471 A | 8/1999 | Voorhees et al. | 395/500 |
| 5,960,375 A | 9/1999 | Warrior et al. | 702/104 |
| 6,049,828 A | 4/2000 | Dev et al. | 709/224 |
| 6,065,337 A * | 5/2000 | Milkovich et al. | 73/379.01 |
| 6,140,952 A | 10/2000 | Gaboury | 341/143 |
| 6,208,247 B1 | 3/2001 | Agre et al. | 340/539 |
| 6,292,108 B1 | 9/2001 | Straser et al. | 340/870.11 |
| 6,295,466 B1 | 9/2001 | Ishikawa et al. | 600/509 |
| 6,304,840 B1 | 10/2001 | Vance et al. | 703/21 |
| 6,352,466 B1 | 3/2002 | Moore | 451/5 |
| 6,370,448 B1 | 4/2002 | Eryurek | 700/282 |
| 6,373,399 B1 | 4/2002 | Johnson et al. | 340/870.11 |
| 6,393,382 B1 | 5/2002 | Williams et al. | 702/188 |
| 6,489,884 B1 * | 12/2002 | Lamberson et al. | 340/7.2 |
| 6,553,336 B1 * | 4/2003 | Johnson et al. | 702/188 |
| 2003/0093248 A1 * | 5/2003 | Vock et al. | 702/188 |
| 2003/0110216 A1 * | 6/2003 | Althin et al. | 709/204 |

FOREIGN PATENT DOCUMENTS

WO          WO 02/05199          1/2002

* cited by examiner

*Primary Examiner*—Edward Urban
*Assistant Examiner*—Tu X Nguyen
(74) *Attorney, Agent, or Firm*—Kinney & Lange P.A.

(57) ABSTRACT

A distributed control system has a plurality of distributed field devices, each of which contains a transducer and a wireless transceiver. The distributed control system includes a base station transceiver, a database and a virtual transmitter application in communication with the database. Each field device transmits and receives data via wireless signals between the communications boards and the base station. The data is stored in the database for later retrieval and evaluation by the virtual transmitter application. The deployed field device senses information and transmits the sensed information wirelessly to a base station. The sensed information is stored in memory on a computer system, and programmatically groomed to provide a measurement value, upon request by a user.

38 Claims, 4 Drawing Sheets

VIRTUAL WIRELESS TRANSMITTER

CROSS-REFERENCE TO RELATED APPLICATION(S)

None.

FIELD OF THE INVENTION

The present invention relates to accessing and monitoring field devices in a distributed control system. Specifically, the invention relates to a system for retrieving raw sensor data using wireless transceivers, storing the sensor data, and grooming and evaluating the sensor data using software.

BACKGROUND OF THE INVENTION

In many industrial settings, control systems are used to monitor and control inventories, processes, and the like. Often, such control systems have a centralized control room, with computer systems having user inputs and outputs and having peripheral systems that are known in the art, such as printers, scanners, and the like. Generally, a controller and process subsystems are coupled to the computer systems.

Typically, control systems are distributed such that field devices are separated or geographically removed from the control room. The process subsystem is connected to the field devices. As used herein, the term "field device" encompasses any device that performs a function in a distributed control system and is known in the control art.

Generally, each field device includes a transducer. A transducer is understood to mean either a device that generates an output signal based on a physical input or that generates a physical output based on an input signal. Typically, a transducer transforms an input into an output having a different form. Often, one system provides power to actuate a transducer, which in turn supplies power usually in another form to a second system. For example, a loudspeaker is a transducer that transforms electrical signals into sound energy. Types of transducers include various analytical equipment, pressure sensors, thermistors, thermocouples, strain gauges, flow transmitters, positioners, actuators, solenoids, indicator lights, and the like.

Traditionally, analog field devices have been connected to the process subsystem and the control room by two-wire twisted-pair current loops, with each device connected to the control room by a single two-wire twisted pair loop. Typically, a voltage differential is maintained between the two wires of approximately 20 to 25 volts, and a current between 4 and 20 milliamps (mA) runs through the loop. An analog field device transmits a signal to the control room by modulating the current running through the current loop to a current proportional to the sensed process variable. An analog field device that performs an action under the control of the control room is controlled by the magnitude of the current through the loop, which is modulated by the ports of the process subsystem under the control of the controller.

Traditional discrete devices transmit or respond to a binary signal. Typically, discrete devices operate with a 24-volt signal (AC or DC), a 110 or 240 volt AC signal, or a 5 volt DC signal. Of course, a discrete device may be designed to operate according to any electrical specification required by the control environment.

While historically field devices were capable of performing only one function, recently hybrid systems that superimpose digital data on the current loop have been used in distributed control systems. The Highway Addressable Remote Transducer (HART) and the Instrument Society of America (ISA) Fieldbus SP50 standards superimpose a digital carrier signal on the current loop signal. The digital carrier signal can be used to send secondary and diagnostic information. Examples of information provided over the carrier signal include secondary process variables, diagnostic information (such as sensor diagnostics, device diagnostics, wiring diagnostics, process diagnostics, and the like), operating temperatures, sensor temperature, calibration data, device ID numbers, configuration information, and so on. Accordingly, a single field device may have a variety of input and output variables and may implement a variety of functions.

Additionally, many field devices contain circuitry for grooming the sensed process variable. Often, the field device includes a sensor, an Analog-to-Digital (A/D) converter and a processor, which is used to groom the signal into a 4 to 20 mA or 1 to 5 volt output. The term "grooming" refers to linearization, temperature compensation, trimming, scaling, or otherwise evaluating the raw A/D signal. The "grooming" process can be modeled as an algebraic equation, according to the specific type and environment of each specific field device. Accordingly, the "grooming" process may vary from one field device to the next, so as to account for specific environmental conditions.

For highly distributed monitoring applications, wireless transmitters are possible. However, implementation of wireless systems has been limited due to limited coverage area, high power consumption, and cost considerations. Specifically, adding a wireless transmitter to the sensor/grooming circuit of the prior art introduces an additional wireless communications card, which converts an analog signal into a digital signal in order to send it over the wireless communication system (e.g. PCS, and the like). Generally, the data from the sensor is already digital and must be converted to an analog signal prior to sending it to the wireless communications board, which then converts the analog signal back into a digital signal. The introduction of the wireless communications board not only increases the amount of circuitry in the field devices, and therefore the cost, but the additional circuitry increases the power consumption of the field device.

While the wireless solution is desirable, power consumption is still too high, and the additional cost of adding a wireless transceiver to each monitoring point is still too high. There is a need for low-cost, low-power consumption, wireless, distributable field devices.

BRIEF SUMMARY OF THE INVENTION

The present invention provides a system and method for wireless communications between field devices and the controller in a distributed control system. Field devices wirelessly transmit raw data and secondary information to a database in network communication with a controller. The raw process variable data, together with secondary information, is stored in the database. A virtual transmitter application programmatically evaluates field device specific raw process variable data and generates a measurement value according to process parameters. The virtual transmitter application generates display signals and transmits the display signals wirelessly to a selected field device upon request.

DETAILED DESCRIPTION

Figure 1:
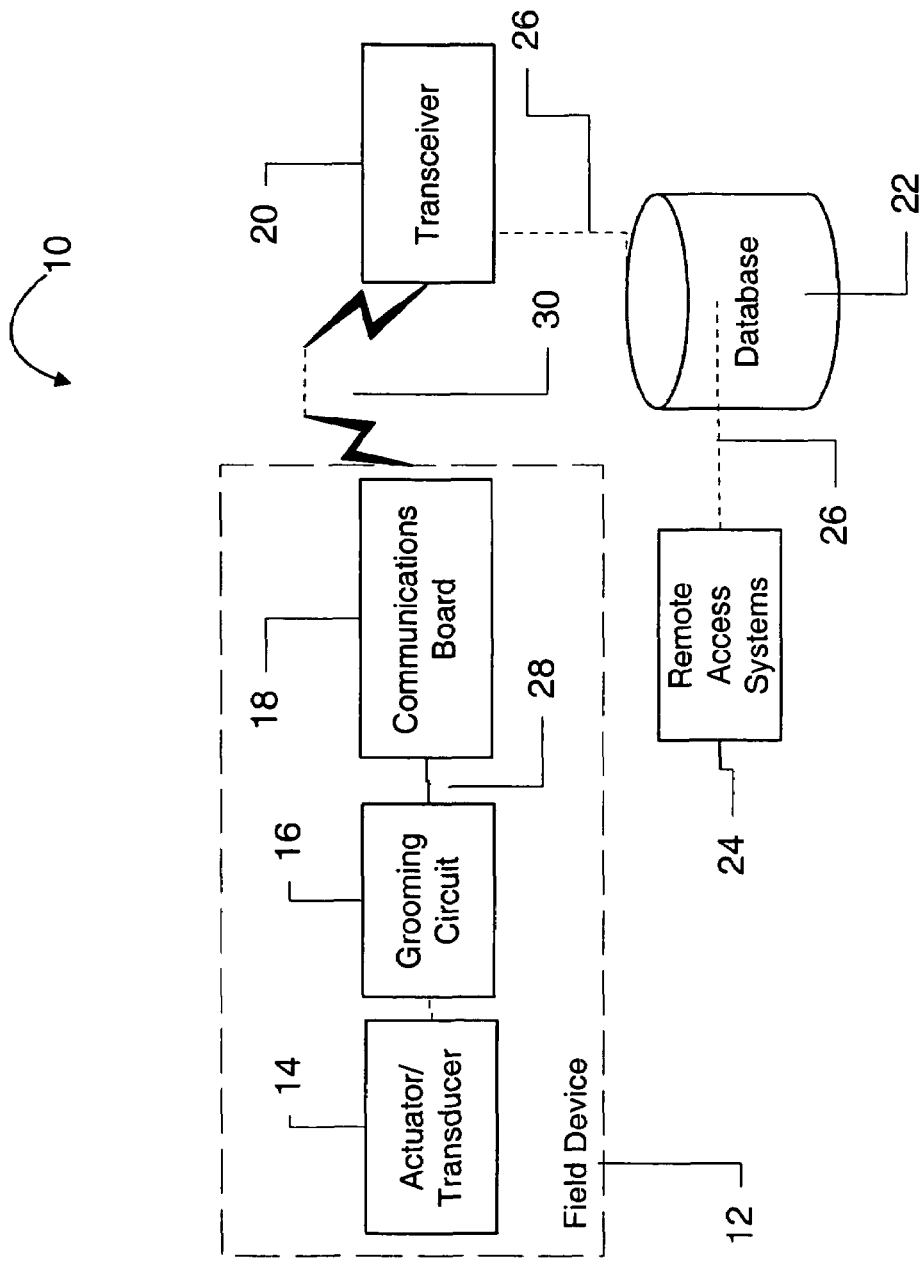
FIG. 1 is a block diagram of a prior art wireless monitoring system.

FIG. 1 shows a prior art wireless monitoring system 10. The system 10 has a field device 12, which includes a transducer 14, a grooming circuit 16, and a wireless communications board 18. In addition to the field device 12, the system 10 includes a wireless receiver 20, a short or long term data storage or a database 22, and a remote access systems 24.

For the purpose of this disclosure, the term "field device" refers to any device that performs a function in a distributed control system and is known in the control art. Each field device includes a transducer. As previously mentioned, a transducer is understood to mean either a device that generates an output signal based on a physical input or that generates a physical output based on an input signal. Types of transducers include various analytical equipment, pressure sensors, thermistors, thermocouples, strain gauges, flow transmitters, positioners, actuators, solenoids, indicator lights, and the like. As previously mentioned, the term "field device" encompasses these devices, as well as any other device that performs a function in a distributed control system and is known in the control art. In the present example, the transducer 14 is a sensor and will be referred to as sensor 14.

Generally, the field device 12 senses a parameter. The sensor 14 generates a digital signal 26 representative of the sensed parameter. The grooming circuit 16 linearizes, temperature compensates, trims, and/or evaluates the signal. Additionally, the grooming circuit 16 typically converts the digital signal 26 into an analog signal 28 and passes the analog signal 28 to the wireless communications board 18. The wireless communications board 18 converts the analog signal 28 into a digital signal and transmits the digital information via a wireless signal 30 to the wireless transceiver 20, which stores the digital information in the database 22 or in other, short term storage systems, such as Random Access Memory, Flash memory, and the like. Remote users using remote access systems 24, such as control applications, can access the digital information directly by querying the database 22.

In this prior art process, the conversion from digital to analog and back to digital sometimes resulted in loss of information. Moreover, the various conversions are duplicative, and the additional circuitry required to perform the conversions added to power consumption issues.

The particular field device used in the prior art could be either analog or digital. Analog devices typically experience drift over time, affecting the accuracy of the analog device. Often, in the prior art, such drift had to also be offset by the grooming circuit 16. Alternatively, expensive drift-resistant sensors or digital sensing devices could be used, which added to the cost.

In the present invention, the grooming circuit 16 is eliminated from the field device, thereby reducing power consumption, reducing the overall production and maintenance costs of the field device, and eliminating unnecessary analog to digital conversions. One or more software applications (typically stored on a networked computer) operates as a "virtual transmitter", replacing the grooming circuit 16, to groom the raw data received from the field devices (including accounting for analog drift). In the context of the present invention, "raw data" or "data" refers to raw A/D counts. In other words, data refers to a single number, such as between 1 and 4096. Without grooming, the single number or raw data has no recognizable meaning. Specifically, the raw data that is transmitted does not indicate the type of parameter, the range of data, and so on. Instead, such information is stored in the database.

The raw data is transmitted wirelessly to a central receiver, and the virtual transmitter application grooms the raw data. By performing the grooming function in software, maintenance and modification processes are simplified, in part, because modifications can be made in software, rather than hardware. Moreover, though field devices are distributed, adjustments made to the software on the networked computer can immediately impact every distributed field device. Finally, by transmitting raw data, instead of a floating point number, the transmission requires fewer bits, and therefore takes less transmission time.

For example, the virtual transmitter application uses one or more tables of values to calibrate and linearize the field device sensor, to compensate for drift, to evaluate and/or groom the data, and so on. The table of values can be refined or modified, if and when new information becomes available from the manufacturer of the field device component, and the calculated values can be made more accurate, immediately. Moreover, by evaluating the transmitted data in software (using the virtual transmitter application) and by storing the transmitted data directly (without refinement), information is preserved for later retrieval and analysis, which may be important if, for example, sensor table values are initially inaccurate.

Figure 2:
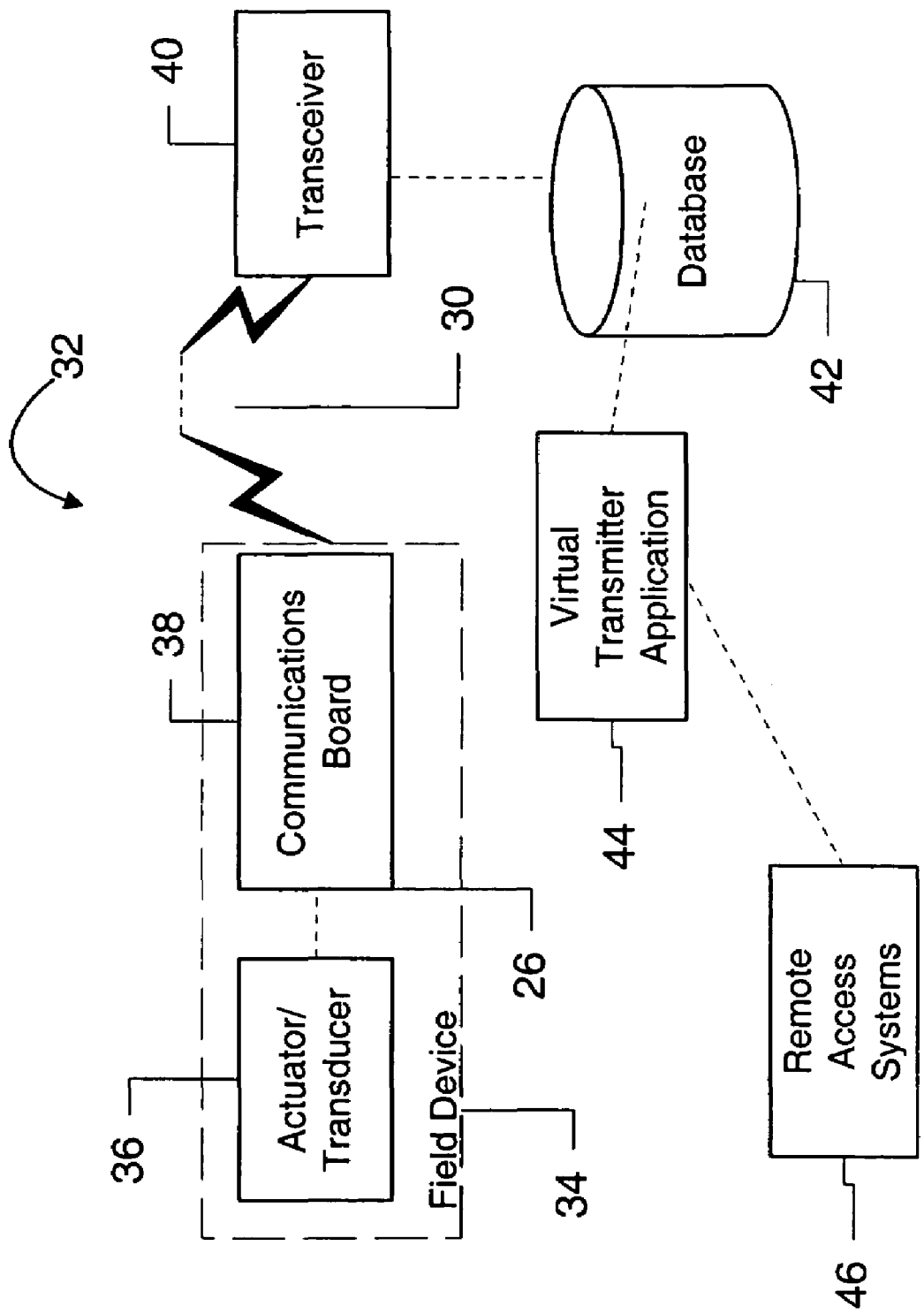
FIG. 2 is a block diagram of a wireless monitoring system of the present invention.

As shown in FIG. 2, a wireless monitoring system 32, according to the present invention, includes one or more field devices 34, comprised of a transducer 36 and a wireless communications board 38, a wireless transceiver 40, a database 42, a virtual transmitter application 44, and remote access systems 46.

The field device 34 includes a transducer 36 and a wireless communications board 38. As previously indicated, a transducer 36 is understood to refer to any device that translates an input into an output having a different form from the input (i.e. a device that generates a physical output based on an electrical input signal or an electrical output based on a physical input signal). Thus, the field device 34 containing a transducer 36 can be either an input device or an output device. The field device 34 can contain both input and output components in communication with the communications board 38. For example, the field device 34 may contain both a sensor 36 and indicator lights or an LCD display, for sensing information and transmitting the raw data or raw A/D count to the transceiver 40 and for receiving a display signal or display code from transceiver 40 and displaying a value on the display.

The transceiver 40 is capable of two-way, wireless communication with a plurality of field devices 34. The two-way wireless communication may be completed using wireless networking technologies (such as IEEE 802.11b wireless access points and wireless networking devices built by Linksys of Irvine, Calif.), cellular or digital networking technologies (such as Microburst® by Aeris Communications, Inc. of San Jose, Calif.), ultra wide band, free space optics, Global System for Mobile Communications (GSM), General Packet Radio Service (GPRS), Code Division Multiple Access (CDMA) spread spectrum technology, infrared communication techniques, SMS (short messaging service/text messaging), or any other wireless technology. More generally, the two-way wireless communication can be performed on any circuit switched network or any packetized routing network. In a preferred embodiment, the field devices 34 and the transceiver 40 communicate using the Microburst® network, or similar technology, which uses existing cellular or digital control channels to transmit data. Using Microburst® signals allows the field devices 34 to be deployed almost anywhere and at almost any distance from the control center. Moreover, the Microburst® signals consume less power than an "always on" wireless networking signal, for example.

Specifically, the transceiver 40 sends a feature request to the field device 34 by using one of the control channels. The communications board 38 of the field device 34 generates a "dead" carrier or busy signal in return, which passes the raw data and secondary information over one of the control channels. Secondary information may include the current battery level of the field device, a device code indicating the type of device, a device ID, temperature, and so on. Each field device 34 is assigned a unique identifier, or ID. Once the raw data is transmitted, the connection is dropped. Typically, the average data transmission contains less than 41 bits and takes less than a second to transmit.

While the discussion is largely centered on Microburst technology, as previously indicated, other wireless technologies can also be used. Generally, the present invention can make use of any wireless protocol capable of supporting data transmissions.

In the preferred embodiment, the sensed parameter is transmitted and stored as a value between 1 and 4096, which is a raw A/D count. Other secondary information is similarly transmitted as single values, thereby minimizing the number of bits being transmitted over the control channel, so as to be able to transmit all the necessary information within a single data burst. The raw values can then be evaluated by the virtual transmitter application 44.

The transceiver 40 retrieves the raw data and secondary information from the control channel of the "dead" carrier or busy signal. The raw data and secondary information are then stored in the database 42 according to a unique ID for the field device. Finally, virtual transmitter application 44 retrieves the raw data for each sensor and evaluates the sensor data using the secondary information. For example, virtual transmitter application 44 can automatically look up a temperature compensation value or multiple from a lookup table to process the sensed data according to the stored temperature value. In this way, the sensed data can be processed to produce an accurate value by the virtual transmitter application 44, without the extra power consumption at the field device 34.

The virtual transmitter application 44 includes one or more software applications in network communication with the database. The virtual transmitter application 44 can be implemented as a single, stand-alone application, as a modular application, or as independent applications. Ideally, the virtual transmitter application 44 can be updated and modified readily, so as to be adaptable to new and/or changing monitoring environments.

The remote access systems 46 generally involve control software. Generally, the remote access systems 46 require computers in network communication with the database 42. The remote access systems 46 provide software menus and other software control elements (such as buttons) for the selection and display. The remote access systems 46 can also be used to drive actuators and to control feedback to the field devices 12. The remote access systems 46 request information from the virtual transmitter application 44. The virtual transmitter application 44 produces a measurement value according to a request from the remote access systems 46, which can be displayed by the remote access systems 46 for a user.

The raw data is converted into groomed data by the virtual transmitter application 44. The groomed data has a recognizable relationship to the sensed parameter, whereas the raw data represents an A/D count, that has no recognizable meaning before grooming.

Generally, the deployed field devices 34 may be powered by any voltage or current source, a common bus, or by individual batteries. Each field device 34 may be powered using an energy conversion device (such as a solar panel and the like), by an energy storage device (such as a battery, a capacitor, and the like), a hybrid (such as fuel cells, a solar assist—rechargeable battery combination, and the like), or by alternative energy sources. In one preferred embodiment, each deployed field device 34 has its own battery power source (not shown), which allows the field devices 34 to be deployed anywhere and in a short amount of time. Adding additional field devices 34 requires adding the additional field device 34 to the call list for the transceiver 40.

In one preferred embodiment, the field devices 34 are deployed in storage tanks or other environments that do not require up-to-the-second data retrieval. For example, by deploying field devices 34 in storage tanks and the like, a daily measurement may be sufficient to determine when a refill order must be made. As the tank is emptied, the sensed data can be analyzed to determine the consumption trend, to predict when the tank will be empty. Specifically, the virtual transmitter application 44 can use the rate of change in the tank to estimate when the tank will be emptied, and generate a message to the customer to indicate the tentative refill order date. Alternatively, the virtual transmitter application 44 can be a learning algorithm, or an algorithm that performs some type of pattern recognition, so as to evaluate the information according to the specific needs of the customer.

By storing raw sensor data instead of "groomed" data, several advantages are realized. First, the field device 34 requires fewer circuit components. Specifically, the data from the field device 34 is linearized by the computer virtual transmitter application 44 at the control center, rather than by circuitry at each field device 34, thereby reducing the cost of deploying each circuit. Second, elimination of the grooming circuit removes a potential layer of conversions and data loss. By maintaining the data in digital form, data is not lost in conversions from digital to analog and back again. Third, by maintaining raw sensor data rather than linearized or groomed data, virtual transmitter application 44 can be used to analyze data trends to detect sensor malfunctions, to warn control personnel when process variables become unstable, and to generate measurement data as needed. Fourth, temperature compensation can be adjusted or refined, and parameter data can be used to evaluate raw data in different ways over time, making the whole system more accurate. Finally, as the virtual transmitter application 44 becomes more sophisticated, additional information may be gleaned from stored process data, that might otherwise be lost by storing only "groomed" data.

In the embodiment of FIG. 2, the virtual transmitter application 44, after storing the raw sensor data, evaluates the sensor data to test for alarm conditions. For example, if a storage tank volume is broken down into 100 increments (from 0 to 100 units), it may be desirable to maintain a storage tank volume to avoid falling below 10 units. The system 32 may be configured by an operator to set an alarm parameter at 10 units for a particular field device. The virtual transmitter application 44 evaluates the sensor data, in light of the secondary information and temperature compensation values, and generates a virtual transmitter output signal (e.g. an alarm signal or a measurement value) to the operator, to the client or to a predetermined individual when the sensed value is at or below the configured alarm level. Additionally, the virtual transmitter application 44 can calculate the rate of volume change in the tank to determine when the alarm is likely to be triggered.

Figure 3:
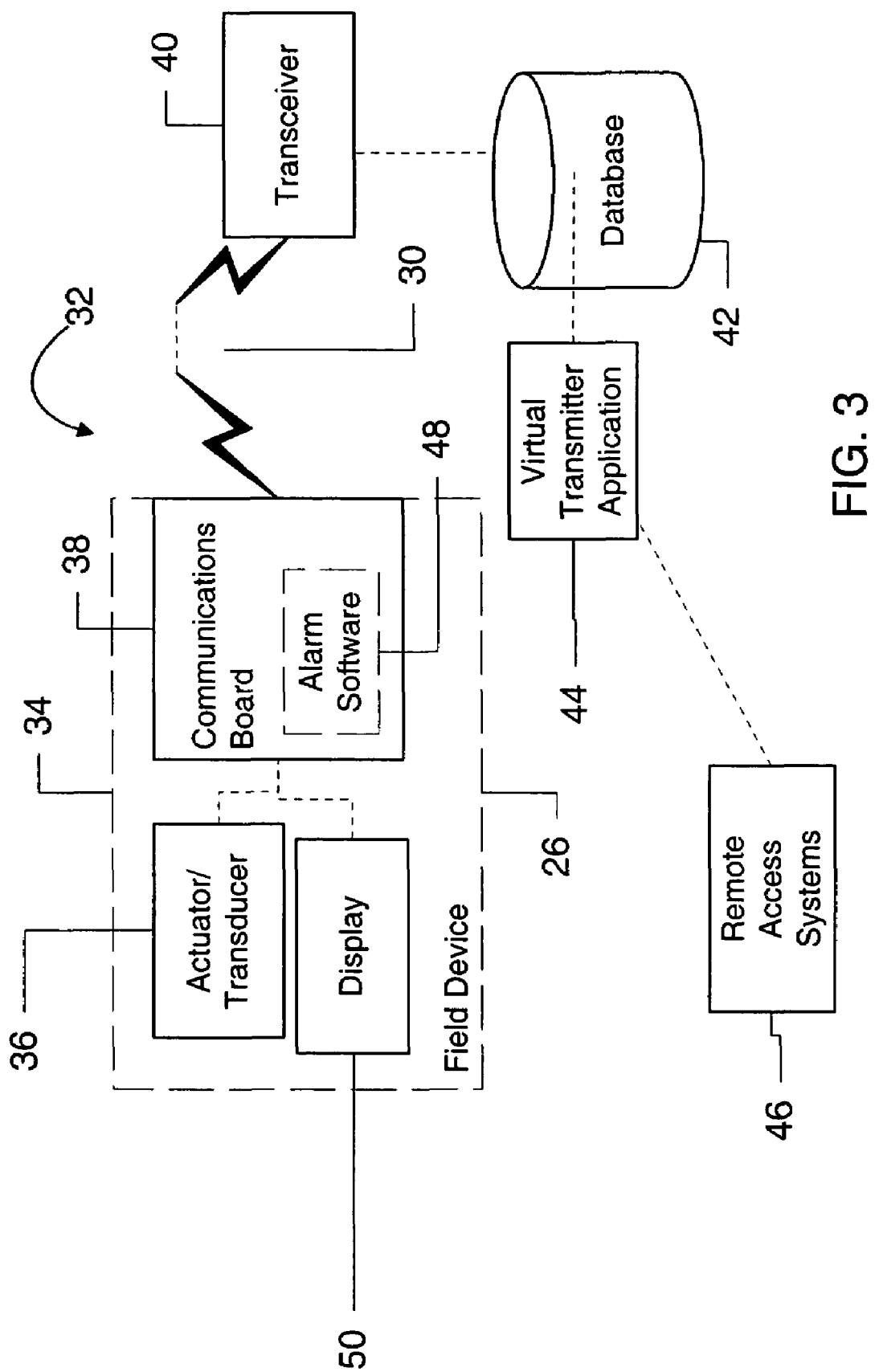
FIG. 3 is a block diagram of an alternative embodiment of the wireless monitoring system of the present invention.

As shown in FIG. 3, the system 32 may also be implemented such that the wireless communication board 38 includes writeable memory containing software code 48 for detecting alarm conditions, such that if the sensed data falls below a programmed level, the communication board 38 is capable of detecting alarm conditions and initiating the alarm signal by calling transceiver 40. In essence, the communication board 38 can be programmed to generate an alarm automatically. Some software development programs have already been implemented to write gaming and other programs for cellular phones, such as J2ME by Sun Microsystems, and the same programs are used to program the communications board 38.

Additionally, each field device 34 can be provided with a display 50, for displaying sensed values and data received from the virtual transmitter application 44. Upon user request, such as by pressing a button on the field device 34, the field device 34 initiates a call to the transceiver 40 and transmits the sensed information together with a display request. Upon receipt by the transceiver 40, the virtual transmitter application 44 evaluates the data and calculates a virtual transmitter output signal (i.e. a measurement value), including a display value (such as a percentage of volume in the tank), that is representative of the transmitted data. Then, the virtual transmitter application 44 causes the transceiver 40 to return the display value or code to the field device 34, which displays the value on the display 50 for the requesting user. The feedback value can be a simple display code, and not the full floating point number, thereby minimizing transmission traffic.

Figure 4:
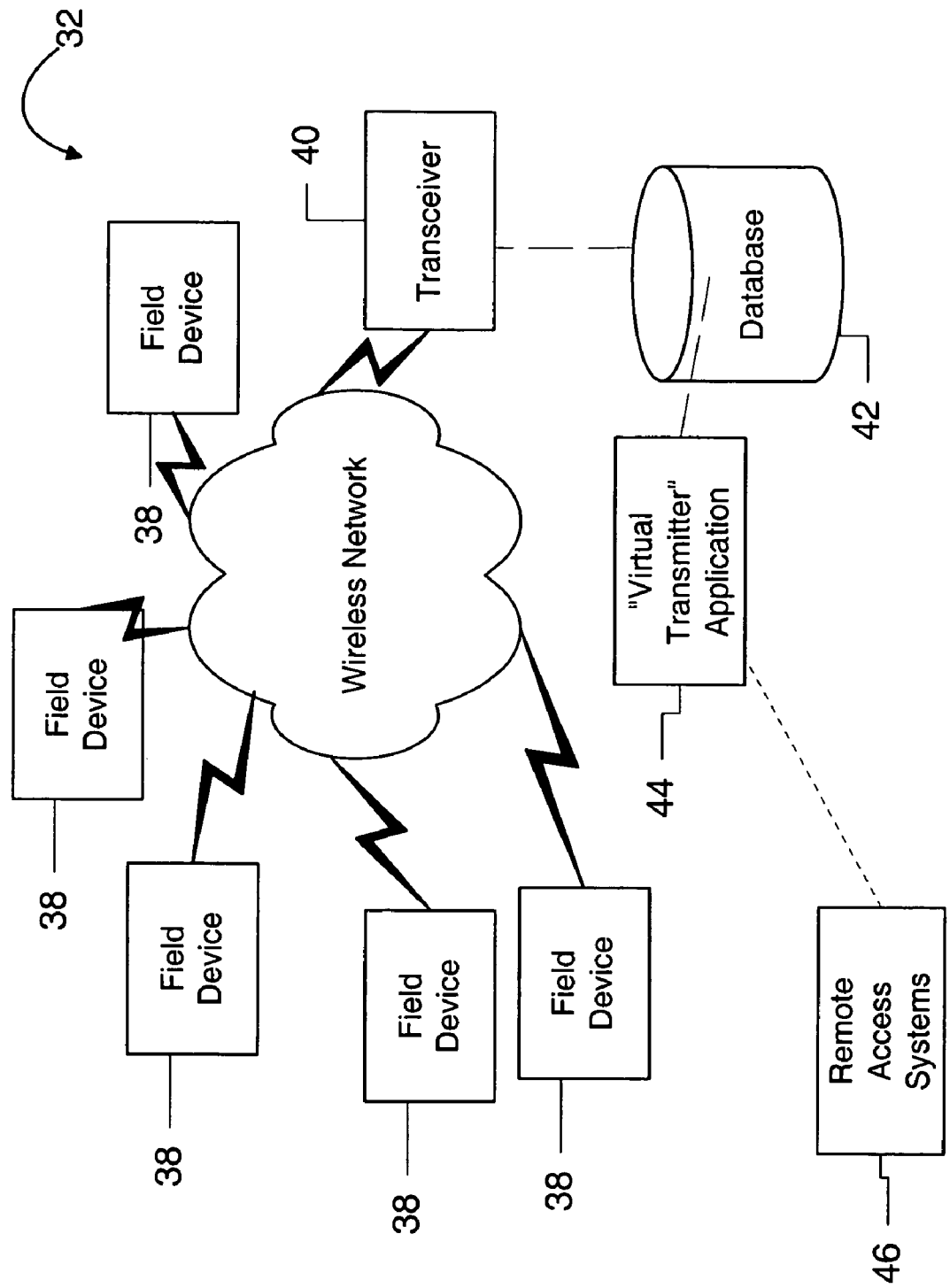
FIG. 4 is a block diagram of a wireless monitoring system of the present invention illustrating multiple wireless field devices.

As shown in FIG. 4, the system 32 preferably includes a plurality of field devices 34. The virtual transmitter application 44 can be configured to cause the transceiver 40 to call each field device 34 in sequence, retrieving the raw data and storing the raw data in the database 42. The stored data can be retrieved by the virtual transmitter application 44, or by other applications (not shown) on the network.

Generally, the database 42 resides on a computer network having other computer workstations. The workstations may or may not be single-use machines. In a preferred embodiment, the computer network has other personal computers and various peripheral devices that are well-known in the art. Access to the database from the various computer workstations can be controlled using various known security measures, including but, not limited to, password protection. The system 32 can be configured to allow or prohibit access as required by the particular application, and can be configured to direct alarm messages over the network as necessary.

As previously indicated, the automatic alarm software could reside on the server that hosts the database 42 or on any computer in network communication with the database 42. The virtual transmitter application 44 can be used by operators to view sensor data, and to generate control signals. Alternatively, control signals could be automatically generated, as in an industrial process, to control positioning and the like.

The virtual transmitter application 44 "grooms" the raw data upon request. Such grooming may include linearization, temperature compensation, trimming, or otherwise evaluating the raw data. Specifically, the virtual transmitter application 44 can evaluate the raw data, and produce a measurement value representative of the sensed variable, taking into account calibration and other transducer information stored in the database 42. The measurement value can be requested by a user in the control room using a control application, or if the field device 34 has a display panel, a worker in the field could press a button on the field device to request a measurement value, which the virtual transmitter application 44 would calculate and wirelessly transmit for display on the display 50.

By calculating the measurement data using virtual transmitter application 44, the amount of circuitry required to sense and process data in a distributed transmitter system is minimized. By transmitting the raw data directly, the field device 34 requires less power consumption, and the processing steps are shifted to the server, which typically has more processing power to begin with. By transmitting only the calculated measurement for display, raw transducer data, or control/command information, bandwidth usage is minimized because only the bytes or codes that are required are actually transmitted. This limits the amount of data that needs to be transmitted, thereby minimizing air-time. While the displayed value is near real-time, the virtual transmitter can send additional information corresponding to the transducer, so that the display can provide calibration and other information, that might not otherwise be available at the transducer.

By implementing the grooming circuitry in software, upgrades to the distributed field devices are minimized. With the present application, software upgrades and grooming calculations can be implemented almost instantly by installing new or updated applications onto the network. If multiple users access the program or if various programs make function calls to the program or application, upgrades and modifications will be implemented immediately for all field devices network-wide.

The control room (not shown) typically includes computers, user input/output devices, various forms of data storage devices, and other computing devices known in the art. Control room is typically coupled to database 42 via a bus (not shown), which may be a proprietary digital communications network, an open digital communications network employing proprietary protocols, or a standard digital communications network employing secure communications protocols. The virtual transmitter application 44 receives various commands from the control room and provides data to the control room.

The present invention provides a number of advantages over the prior art. First, in the preferred embodiment, since no analog conversions are performed on the data, the overall accuracy of the data is increased. Second, since the virtual transmitter application 44 is a software application on the server, a software upgrade can be effected system-wide and instantaneously with one software installation, rather than adding or upgrading software in each distributed device, which would be costly, time-consuming, and often very difficult. Additionally, new functionality such as pattern recognition and new diagnostic software can be added at any time, without changing field devices, simply by adding the new application to the server. Since the data is stored in raw form, any upgrade to the virtual transmitter application is backward compatible with data in the database. The resulting monitoring system requires less circuitry, consumes less power, and is more flexible and adaptable than prior art systems that groom the data prior to transmission and storage.

The system of the present invention can also be deployed in an alternative embodiment where a plurality of field devices 34 share a single communications board 38, such that each actuator/transducer 36 transmits its sensed parameter to the shared communications board 38 for wireless transmission to the database 42.

Although the present invention has been described with reference to preferred embodiments, workers skilled in the art will recognize that changes may be made in form and detail without departing from the spirit and scope of the invention.

The invention claimed is:

1. A method of monitoring a distributed system having a plurality of deployed field devices and at least one computer at a control room, each field device containing a transducer and a wireless transceiver, the method comprising:

sensing information with the deployed field devices to produce ungroomed digital transducer data;

wirelessly transmitting the ungroomed digital transducer data from each field device to a base station;

receiving the transmitted information ungroomed digital transducer data from each field device at the base station;

storing the received information ungroomed digital transducer data in a database on a computer network;

storing in the database, for each field device, secondary information needed to groom raw data from that field device;

running a virtual transmitter application program on a server connected to the computer network, the server being remote from the field devices;

receiving at the server a request by a computer at the control room for a measurement value from a selected field device;

retrieving to the server from the database stored ungroomed digital transducer data generated by the selected field device and the stored secondary information for the selected field device;

programmatically grooming at the server the stored ungroomed digital transducer data with the virtual transmitter application using the stored secondary information to derive the measurement value; and transmitting over the network the measurement value from the server to the computer at the control room that requested the measurement value.

2. The method of claim 1, further comprising:

evaluating the measurement value against a predetermined parameter value;

generating an output signal; and transmitting the output signal.

3. The method of claim 2, wherein the output signal is a display code, and wherein the step of transmitting the output signal comprises:

transmitting a display code to a selected field device for display on a field device display.

4. The method of claim 2, wherein the output signal is an adjustment signal, and wherein the step of transmitting the output signal comprises:

transmitting the adjustment signal to a selected field device for altering a parameter associated with the selected field device.

5. The method of claim 2, wherein the output signal is an alarm signal.

6. A distributed monitoring system comprising:

a plurality of field devices, each field device comprising:
 a transducer for producing raw digital data based upon a physical measurement of a sensed parameter, the raw digital data being ungroomed; and
 a wireless transceiver for wirelessly transmitting the raw digital data;

a base transceiver for receiving the transmitted raw digital data from each field device;

a file for storing the raw digital data for each field device and for storing secondary information needed to groom the raw digital data from that field device, the file being accessible over a network; and a server on the network, the server being remote from the field devices and having a virtual transmitter application for retrieving, upon a request received over the network from a computer at a control room, the stored raw digital data and the secondary information, generating a measurement value having a recognizable relationship to the sensed parameter for each field device identified in the request by grooming the stored raw digital data using the stored secondary information for that field device, and transmitting the measurement value to the computer at the control room that made the request.

7. The system of claim 6, wherein the measurement value is calculated by inserting the raw digital data and the secondary information into an equation.

8. The system of claim 6, wherein the raw digital data is a raw A/D count derived from the transducer.

9. The system of claim 6, wherein the wireless transceiver transmits the raw digital data over control channels of a wireless communications link.

10. The system of claim 9, wherein the wireless communications link is a link on a packetized routing network.

11. The system of claim 9, wherein the wireless communications link is a link on a circuit switched network.

12. The system of claim 6, wherein the wireless transceiver is selected from the group consisting of a cellular communications circuit, a digital communications circuit, an infrared communications circuit, and a IEEE 802.11b compatible wireless communications circuit.

13. The system of claim 6, wherein the virtual transmitter application comprises:

a plurality of software applications in communication with the database.

14. The distributed monitoring system of claim 13, wherein at least one of the plurality of software applications performs pattern recognition algorithms on the raw digital data stored in the database.

15. The system of claim 6, wherein the field devices are battery powered.

16. The system of claim 6, wherein the virtual transmitter application further comprises:

an alarm function for generating an alarm signal when the raw digital data deviate from predetermined parameters.

17. The system of claim 6, wherein the base transceiver transmits display information to the wireless transceiver for display on a display of the field device according to a request from a user.

18. The system of claim 17, wherein the virtual transmitter application calculates the display information using the secondary information to evaluate the stored digital data against one or more tables of values.

19. The system of claim 6, wherein the virtual transmitter application comprises:

diagnostic applications for programmatically selecting and retrieving digital data and for comparing the digital data against predetermined values.

20. A method of monitoring a distributed system having a plurality of deployed field devices, each field device containing a transducer and a wireless transceiver, the method comprising:

sensing a parameter with one of the deployed field devices to produce raw digital data;

wirelessly transmitting the raw digital data from the field device to a base station, the raw digital data representing an ungroomed numerical value produced by a physical measurement of the parameter taken by the transducer;

receiving the measurement information from the field device at the base station;

storing the raw digital data in memory on a computer network;

storing secondary information for each field device in memory on the computer network;

programmatically grooming, upon request from computer at a control room, the stored raw digital data to derive a measurement value representative of the parameter, the grooming being performed by a virtual transmitter application running on a server on the network using the stored secondary information for the field device that produced the stored raw digital data, the server being remote from the field devices; and transmitting the measurement value over the network from the server to the computer at a control room that made the request.

21. The method of claim 20, wherein the step of programmatically grooming the stored measurement information comprises:

retrieving the stored raw digital data from the memory;

programmatically calculating the measurement value from the stored raw digital data according to a grooming equation.

22. The method of claim 20, further comprising:

evaluating the derived measurement value against predetermined parameter values;

generating an output signal; and transmitting the output signal.

23. The method of claim 22, wherein the output signal is a display code, and wherein the step of transmitting the output signal comprises:

transmitting a display code to the field device for display on a field device display.

24. The method of claim 22, wherein the output signal is an alarm signal.

25. A distributed system comprising:

a distributed network of field devices, each field device having a transducer and an associated first wireless transceiver for transmitting wireless signals comprising raw digital data representing an ungroomed numerical value produced by a physical measurement made by the transducer;

a second wireless transceiver for receiving the wireless signals;

a database for storing the raw digital data based on the wireless signals received by the second wireless transceiver and for storing secondary information associated with each field device; and a virtual transmitter application running on a server connected to a network at a location remote from the field devices for retrieving from the database the stored data and secondary information associated with each field device, for generating on request from a computer at a control room a groomed measurement value based on the raw digital data and secondary information, wherein the transmitter application grooms the raw digital data according to the secondary information, and for transmitting the measurement value over the network to the computer at the control room making the request.

26. The system of claim 25, wherein the raw digital data comprises:

a raw A/D count derived from the transducer.

27. The system of claim 25, wherein the first wireless transceiver is selected from the group consisting of a cellular communications circuit, a digital communications circuit, an ultra-wideband communications circuit, and free space optics communications circuit.

28. The system of claim 25, wherein the wireless signals are transmitted using control channels of a wireless communications link.

29. The system of claim 25, wherein one or more of the field devices are powered using energy conversion devices.

30. The system of claim 25, the transmitter application further comprises:

an alarm function for generating an alarm signal when the measurement value deviates from predetermined parameters.

31. The system of claim 25, wherein the wireless signals are transmitted using a circuit switched network.

32. The system of claim 25, wherein the wireless signals are transmitted using a packetized routing network.

33. The system of claim 25, wherein the second wireless transceiver transmits display information to the first wireless transceiver for display on a display of the field device according to a request from a user.

34. The system of claim 33, wherein the transmitter application calculates the display information using the secondary information.

35. The system of claim 25, wherein the transmitter application comprises:

diagnostic applications for programmatically selecting and retrieving digital data and for comparing the data against predetermined values.

36. The system of claim 25, wherein the transmitter application comprises:

a plurality of software applications in communication with the database.

37. The system of claim 36, wherein at least one of the plurality of software applications performs pattern recognition algorithms on the digital data stored in the database.

38. A method of monitoring a distributed system having a plurality of deployed field devices, each field device containing a transducer and a wireless transceiver, the method comprising:

sensing a parameter with one of the deployed field devices to produce raw digital data;

wirelessly transmitting the raw digital data from the field device to a base station, the raw digital data representing an ungroomed numerical value produced by a physical measurement of the parameter taken by the transducer;

receiving the measurement information from the field device at the base station;

storing the raw digital data in memory on a computer network;

programmatically grooming, upon request from a computer at the control room, the stored raw digital data to derive a measurement value representative of the parameter, the grooming being performed by a virtual transmitter application running on a server on the network, the server being remote from the field devices;

transmitting the measurement value over the network from the server to the computer at the control room that made the request;

evaluating the derived measurement value against predetermined parameter values;

generating an adjustment signal; and transmitting the adjustment signal to the field device for altering a parameter associated with the field device.

* * * * *